(12) United States Patent
Crawford

(10) Patent No.: US 12,504,586 B2
(45) Date of Patent: Dec. 23, 2025

(54) FIBER OPTICAL CONNECTORS

(71) Applicant: PPC BROADBAND, INC., East Syracuse, NY (US)

(72) Inventor: William Crawford, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/740,391

(22) Filed: Jan. 10, 2020

(65) Prior Publication Data

US 2020/0225426 A1 Jul. 16, 2020

Related U.S. Application Data

(63) Continuation-in-part of application No. 16/532,476, filed on Aug. 5, 2019, now abandoned.

(60) Provisional application No. 62/790,503, filed on Jan. 10, 2019, provisional application No. 62/714,123, filed on Aug. 3, 2018.

(51) Int. Cl.
 *G02B 6/38* (2006.01)
(52) U.S. Cl.
 CPC .......... *G02B 6/3869* (2013.01); *G02B 6/387* (2013.01); *G02B 6/38875* (2021.05); *G02B 6/3888* (2021.05)
(58) Field of Classification Search
 CPC .... G02B 6/387; G02B 6/3887; G02B 6/3869; G02B 6/3871; G02B 6/3843
 USPC ........ 385/60, 62, 65, 66, 71, 72, 78, 81, 83, 385/84, 92
 See application file for complete search history.

(56) References Cited

U.S. PATENT DOCUMENTS

| | | | | |
|---|---|---|---|---|
| 4,880,291 A | * | 11/1989 | Aberson, Jr. | ........ G02B 6/3882 385/55 |
| 5,073,045 A | * | 12/1991 | Abendschein | ....... G02B 6/3897 385/90 |
| 5,147,209 A | * | 9/1992 | Litwin | ................... H05K 1/141 439/70 |
| 5,212,752 A | | 5/1993 | Stephenson et al. | |

(Continued)

FOREIGN PATENT DOCUMENTS

| CN | 101268396 A | 9/2008 |
|---|---|---|
| CN | 102439502 A | 5/2012 |

(Continued)

OTHER PUBLICATIONS

Oct. 29, 2019 International Search Report issued in PCT/US19/45184.

(Continued)

*Primary Examiner* — Kaveh C Kianni
(74) *Attorney, Agent, or Firm* — MH2 TECHNOLOGY LAW GROUP LLP

(57) ABSTRACT

A fiber optic connector for terminating a fiber optic cable includes an inner housing, an outer housing, a connector sub-assembly, and a crimp sleeve. The outer housing is disposed radially outward of the inner housing, and the connector sub-assembly includes a ferrule basket configured to receive a ferrule that terminates a fiber of the fiber optic cable. The crimp sleeve surrounds and is crimped onto a rearward portion of the connector sub-assembly and an end (Continued)

US 12,504,586 B2

Page 2 portion of the fiber optic cable. The inner housing is configured to be securely disposed about the crimp sleeve, and the outer housing is configured to be secured disposed about the inner housing.

31 Claims, 15 Drawing Sheets

(56) References Cited

U.S. PATENT DOCUMENTS

| | | | | |
|---|---|---|---|---|
| 5,287,425 | A | | 2/1994 | Chang |
| 5,394,503 | A | * | 2/1995 | Dietz, Jr. ............. G02B 6/3895 385/139 |
| 5,633,970 | A | * | 5/1997 | Olson ................. G02B 6/3812 385/84 |
| 5,715,348 | A | * | 2/1998 | Falkenberg ........ G02B 6/44715 385/135 |
| 5,765,198 | A | * | 6/1998 | McCrocklin ........... G11C 29/88 711/170 |
| 5,809,192 | A | | 9/1998 | Manning et al. |
| 5,857,860 | A | * | 1/1999 | Silliman ................ H01R 24/46 348/E7.053 |
| 5,857,861 | A | * | 1/1999 | Silliman ................ H01R 24/46 348/E7.053 |
| 5,909,063 | A | * | 6/1999 | Silliman ................ H01R 24/46 200/51.07 |
| 5,909,298 | A | * | 6/1999 | Shimada ............ G02B 6/44528 398/164 |
| 5,909,526 | A | | 6/1999 | Roth et al. |
| 6,002,331 | A | * | 12/1999 | Laor .................... G02B 6/3807 340/687 |
| 6,041,374 | A | * | 3/2000 | Postman ................. G06F 3/023 710/52 |
| 6,173,097 | B1 | * | 1/2001 | Throckmorton ..... G02B 6/3806 385/56 |
| 6,179,475 | B1 | * | 1/2001 | Takamatsu ........... G02B 6/3897 385/88 |
| 6,375,362 | B1 | * | 4/2002 | Heiles .................... G02B 6/389 385/55 |
| 6,459,175 | B1 | * | 10/2002 | Potega .................... B60L 53/11 307/132 M |
| 6,579,014 | B2 | | 6/2003 | Melton et al. |
| 6,648,520 | B2 | | 11/2003 | Melton et al. |
| 6,757,753 | B1 | * | 6/2004 | DeKoning ............... G06F 3/061 710/36 |
| 6,971,895 | B2 | * | 12/2005 | Sago .................... G02B 6/3895 439/916 |
| 7,090,406 | B2 | | 8/2006 | Melton et al. |
| 7,104,702 | B2 | * | 9/2006 | Barnes ................. G02B 6/3821 385/139 |
| 7,113,679 | B2 | | 9/2006 | Melton et al. |
| 7,270,487 | B2 | * | 9/2007 | Billman ............... G02B 6/3846 385/55 |
| 7,467,896 | B2 | | 12/2008 | Melton et al. |
| 7,568,844 | B2 | | 8/2009 | Luther et al. |
| 7,785,015 | B2 | | 8/2010 | Melton et al. |
| 7,914,343 | B2 | * | 3/2011 | Alexander ............. H01R 31/06 439/669 |
| 7,918,609 | B2 | | 4/2011 | Melton et al. |
| 8,342,755 | B2 | * | 1/2013 | Nhep .................... G02B 6/3888 385/78 |
| 8,439,577 | B2 | | 5/2013 | Jenkins |
| 9,039,293 | B2 | * | 5/2015 | Hill ........................... G02B 6/46 385/77 |
| 9,664,862 | B2 | * | 5/2017 | Lu ......................... G02B 6/3893 |
| 9,927,581 | B1 | * | 3/2018 | Rosson ................ G02B 6/3898 |
| 10,114,176 | B2 | | 10/2018 | Gimblet et al. |
| 10,151,887 | B2 | * | 12/2018 | de Jong ................... G02B 6/443 |
| 10,359,577 | B2 | * | 7/2019 | Dannoux ............... G02B 6/3825 |
| 10,386,584 | B2 | * | 8/2019 | Rosson ................ G02B 6/3826 |
| 10,429,595 | B2 | * | 10/2019 | Van Baelen .......... G02B 6/4471 |
| 10,545,305 | B2 | * | 1/2020 | Leeman ............... G02B 6/44528 |
| 10,976,513 | B2 | * | 4/2021 | Allen ..................... G02B 6/443 |
| 12,259,585 | B2 | * | 3/2025 | Gniadek ............... G02B 6/3885 |
| 2001/0049221 | A1 | * | 12/2001 | Abbott ................. H01R 12/7005 439/488 |
| 2002/0064349 | A1 | * | 5/2002 | Ngo ..................... G02B 6/3897 385/53 |
| 2002/0067894 | A1 | * | 6/2002 | Scanzillo ............. G02B 6/3861 385/86 |
| 2002/0081076 | A1 | * | 6/2002 | Lampert .............. G02B 6/3895 385/72 |
| 2002/0146033 | A1 | * | 10/2002 | Benayoun ............ H04L 49/351 370/465 |
| 2003/0002808 | A1 | * | 1/2003 | Lampert .............. G02B 6/3893 385/70 |
| 2003/0063867 | A1 | * | 4/2003 | McDonald ........... G02B 6/3897 385/76 |
| 2004/0052471 | A1 | * | 3/2004 | Colombo ............. G02B 6/3895 385/53 |
| 2004/0054761 | A1 | * | 3/2004 | Colombo ................ H04L 41/00 340/5.2 |
| 2005/0100033 | A1 | * | 5/2005 | Arndt ................... H04L 67/1097 370/412 |
| 2005/0120173 | A1 | * | 6/2005 | Minowa ................ G06F 15/16 712/27 |
| 2006/0120672 | A1 | * | 6/2006 | Cody .................. G02B 6/44528 385/86 |
| 2006/0193562 | A1 | | 8/2006 | Theuerkorn |
| 2007/0072474 | A1 | * | 3/2007 | Beasley ................... H02J 50/40 439/332 |
| 2007/0147267 | A1 | * | 6/2007 | Holland ................. H04L 49/25 370/465 |
| 2007/0160327 | A1 | * | 7/2007 | Lewallen ............. G02B 6/3817 385/53 |
| 2007/0276965 | A1 | * | 11/2007 | Johnson .................... G06F 3/00 710/8 |
| 2008/0226236 | A1 | * | 9/2008 | Pepin ................... G02B 6/3858 385/81 |
| 2009/0060421 | A1 | * | 3/2009 | Parikh ................ G02B 6/44775 385/71 |
| 2009/0148101 | A1 | * | 6/2009 | Lu ......................... G02B 6/3893 385/56 |
| 2010/0211664 | A1 | * | 8/2010 | Raza ...................... H01R 24/64 713/300 |
| 2010/0215321 | A1 | * | 8/2010 | Jenkins ................ G02B 6/3893 29/428 |
| 2011/0043333 | A1 | * | 2/2011 | German ................. H04Q 1/136 340/815.45 |
| 2011/0058785 | A1 | * | 3/2011 | Solheid ............. G02B 6/44528 385/135 |
| 2011/0081144 | A1 | * | 4/2011 | Zhao .................... H04B 10/272 398/20 |
| 2011/0116748 | A1 | * | 5/2011 | Smrha .................. G02B 6/4452 385/76 |
| 2011/0123157 | A1 | * | 5/2011 | Belsan ................... G02B 6/4292 439/523 |
| 2011/0200286 | A1 | * | 8/2011 | Smith ................... G02B 6/3897 385/86 |
| 2012/0166582 | A1 | * | 6/2012 | Binder ....................... G06F 7/58 709/217 |
| 2012/0188865 | A1 | * | 7/2012 | Michaelis ............... G01R 31/68 370/200 |
| 2013/0078848 | A1 | * | 3/2013 | Kummetz ................ H04Q 1/138 439/488 |
| 2013/0089291 | A1 | * | 4/2013 | Jol ....................... G02B 6/3817 439/660 |
| 2013/0201006 | A1 | * | 8/2013 | Kummetz .......... G06K 7/10019 340/10.1 |
| 2014/0133808 | A1 | * | 5/2014 | Hill ....................... G02B 6/3879 385/84 |
| 2014/0178013 | A1 | * | 6/2014 | Nielson ................ G02B 6/3861 385/83 |
| 2014/0226460 | A1 | * | 8/2014 | Kretschmann ......... G05B 19/05 370/419 |
| 2015/0016780 | A1 | | 1/2015 | Skluzacek et al. |
| 2015/0030323 | A1 | * | 1/2015 | Lawson ................ G02B 6/3825 398/33 |

(56) References Cited

U.S. PATENT DOCUMENTS

| | | | |
|---|---|---|---|
| 2015/0268434 A1* | 9/2015 | Barnette, Jr. | G02B 6/4472 |
| | | | 385/135 |
| 2015/0339570 A1* | 11/2015 | Scheffler | G06N 3/04 |
| | | | 706/27 |
| 2016/0154186 A1 | 6/2016 | Gimblet et al. | |
| 2016/0209599 A1 | 7/2016 | Van Baelen et al. | |
| 2016/0259135 A1* | 9/2016 | Gniadek | G02B 6/3895 |
| 2016/0356963 A1 | 12/2016 | Liu et al. | |
| 2018/0003902 A1* | 1/2018 | Rosson | G02B 6/3871 |
| 2018/0006416 A1* | 1/2018 | Lloyd | H01R 12/79 |
| 2018/0031782 A1 | 2/2018 | Zseng | |
| 2018/0081135 A1* | 3/2018 | Hill | G02B 6/4442 |
| 2018/0081136 A1* | 3/2018 | Hill | G02B 6/4444 |
| 2018/0156988 A1* | 6/2018 | Gniadek | H01R 13/6271 |
| 2018/0217335 A1* | 8/2018 | Leeson | G02B 6/3887 |
| 2018/0329157 A1* | 11/2018 | Crawford | G02B 6/3897 |
| 2019/0079252 A1* | 3/2019 | Watanabe | G02B 6/3898 |
| 2019/0154930 A1* | 5/2019 | Ho | G02B 6/4256 |
| 2019/0285808 A1* | 9/2019 | Lee | G02B 6/3816 |
| 2019/0341711 A1* | 11/2019 | Justin | H02G 11/02 |
| 2020/0064564 A1* | 2/2020 | Ho | G02B 6/3887 |
| 2020/0088964 A1* | 3/2020 | Desard | G02B 6/4454 |
| 2020/0200982 A1* | 6/2020 | Dowling | G02B 6/44528 |
| 2020/0225426 A1* | 7/2020 | Crawford | G02B 6/38875 |
| 2020/0400897 A1* | 12/2020 | Hu | G02B 6/3894 |
| 2021/0002170 A1* | 1/2021 | Chien | H05B 45/30 |
| 2021/0149121 A1* | 5/2021 | Iizumi | G02B 6/387 |
| 2021/0223485 A1* | 7/2021 | Leeson | G02B 6/3893 |
| 2021/0364705 A1* | 11/2021 | Crawford | G02B 6/3893 |
| 2021/0373254 A1* | 12/2021 | Wong | G02B 6/3821 |
| 2022/0236496 A1* | 7/2022 | Leeson | G02B 6/3869 |
| 2023/0367077 A1* | 11/2023 | Latre Espuna | G02B 6/3846 |
| 2024/0178615 A1* | 5/2024 | Brandt | H01R 13/502 |

FOREIGN PATENT DOCUMENTS

| | | |
|---|---|---|
| CN | 107666051 A | 2/2018 |
| EP | 3141940 A1 | 3/2017 |
| GB | 2468442 A | 9/2010 |

OTHER PUBLICATIONS

Search Report dated Apr. 6, 2020 in International Patent Application No. PCT/US2020/013239, 2 pages.
Written Opinion dated Apr. 6, 2020 in International Patent Application No. PCT/US2020/013239, 5 pages.
Written Opinion dated Oct. 29, 2019 in International Patent Application No. PCT/US2019/045184, 5 pages.
Extended European Search Report mailed Mar. 29, 2022 in corresponding European Application No. 19844958.9, 9 pages.
Chinese First Office Action mailed Apr. 6, 2022 in corresponding Chinese Application No. 2019800657090, translated, 11 pages.
Extended European Search Report dated Aug. 22, 2022 in corresponding European Application No. 20738611.1, 8 pages.
Indian First Examination Report dated Oct. 13, 2022 in corresponding Indian Application No. 202117007139, translated, 6 pages.
Chinese First Office Action dated Jan. 19, 2023 in corresponding Chinese Application No. 202080019486.7, translated, 18 pages.
Chinese Second Office Action dated Sep. 21, 2023 in corresponding Chinese Application No. 202080019486.7, 9 pages.
Australian First Examination Report dated Apr. 5, 2024 in corresponding Australian Application No. 2019312743, 3 pages.
Australian First Examination Report dated Oct. 31, 2024 in corresponding Australian Application No. 2020207399, 3 pages.
Canadian First Examination Report dated Jan. 29, 2025 in corresponding Canadian Application No. 3,126,354, 4 pages.

* cited by examiner

FIBER OPTICAL CONNECTORS

CROSS-REFERENCE TO RELATED APPLICATIONS

This is a Continuation-in-Part of application Ser. No. 16/532,476, filed Aug. 5, 2019, pending, which claims the benefit of U.S. Provisional Application No. 62/714,123, filed Aug. 3, 2018. This nonprovisional application also claims the benefit of U.S. Provisional Application No. 62/790,503, filed Jan. 10, 2019. The disclosures of the prior applications are hereby incorporated by reference herein in their entirety.

TECHNICAL FIELD

The present disclosure is directed to a fiber optical connector that attaches a connector sub-assembly to an optical fiber cable without the use of an outer clamp shell. More particularly, a fiber optical connector includes a one-piece inner housing that connects the connector sub-assembly to the optical fiber cable.

BACKGROUND

Fiber optical communication systems typically use a network of fiber optic cables to transmit large volumes of data. Typical fiber optical connectors include a ferrule that supports an end portion of an optical fiber. When two fiber optical connectors are interconnected, end faces of the ferrules, on each connector, directly oppose one another. Thus, the optical fibers, which are supported by each ferrule, are also directly opposed to each other. Furthermore, springs in each connector bias the optical fibers towards each other when the connectors are in this interconnected state. An optical signal can then be transmitted from one optical fiber to the other optical fiber.

Traditionally, the ferrule may be disposed in a ferrule holder carrier, which is then secured to an outer barrel. Conventional outer barrels include a clamp shell arrangement in order to easily fit the barrel around and over the ferrule holder carrier and the cable. Thus, the clamp shell may open in order to move the barrel over and around these components. An outer housing may then be disposed over the clamp shell in order to provide a secure and stable connector assembly.

It may be desirable to provide a hardened optical fiber connector that overcomes one or more problems of conventional prior art connectors that are recognized by persons having ordinary skill in the art.

SUMMARY

According to various aspects of the present disclosure, a fiber optic connector for terminating a fiber optic cable includes an inner housing, an outer housing, a connector sub-assembly, and a crimp sleeve. The outer housing is disposed radially outward of the inner housing, and the connector sub-assembly includes a ferrule basket configured to receive a ferrule that terminates a fiber of the fiber optic cable. The crimp sleeve surrounds and is crimped onto a rearward portion of the connector sub-assembly and an end portion of the fiber optic cable. The inner housing is configured to be securely disposed about the crimp sleeve, and the outer housing is configured to be secured disposed about the inner housing.

BRIEF DESCRIPTION OF THE DRAWINGS

Features and advantages of the present disclosure are described in, and will be apparent from, the following Brief Description of the Drawings and Detailed Description.

DETAILED DESCRIPTION OF EMBODIMENTS

Figure 1:
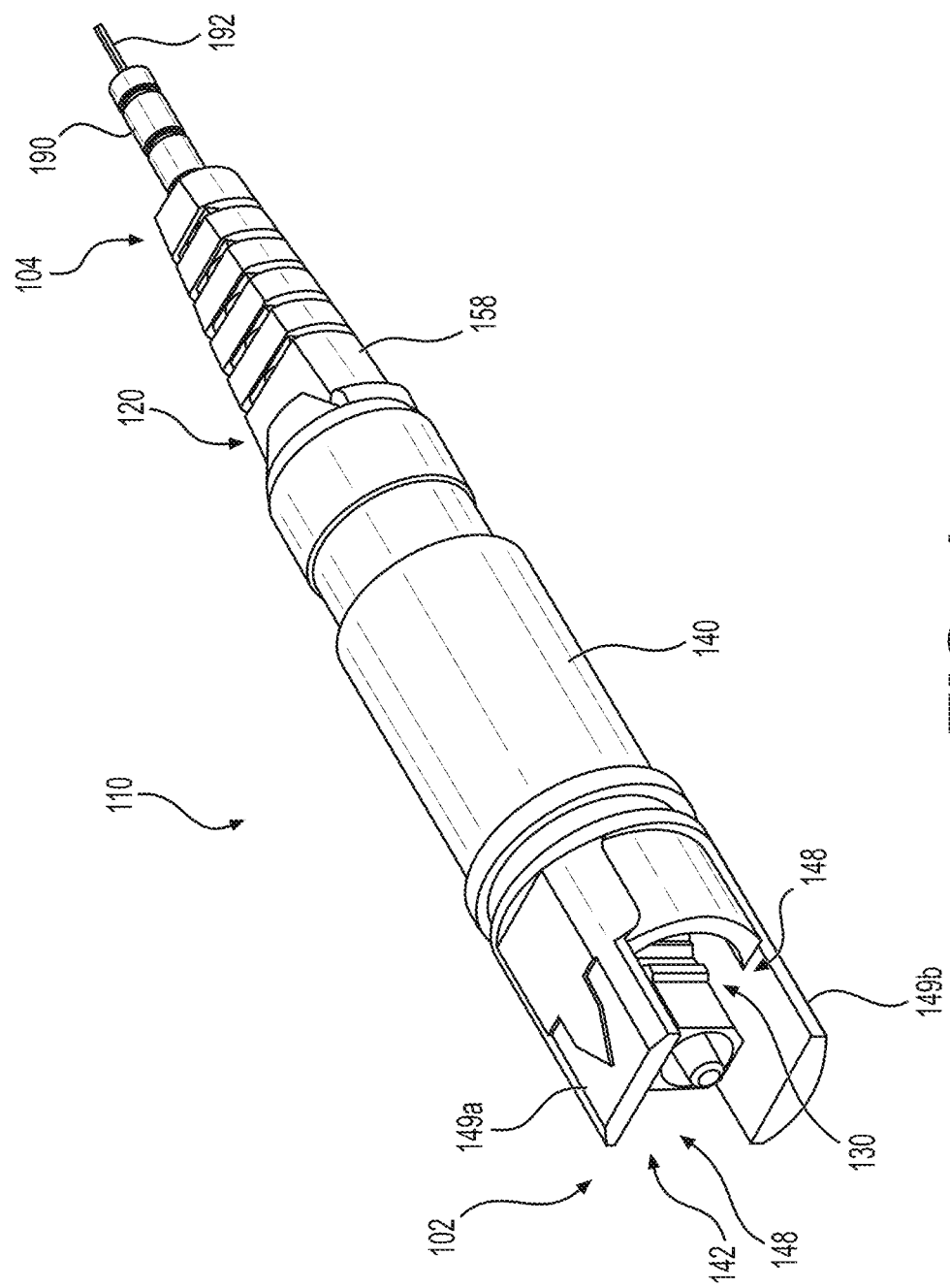
FIG. 1 is a perspective view of an exemplary hardened fiber optic connector in accordance with various aspects of the disclosure.

Throughout the description, like reference numerals will refer to like parts in the various drawing figures. As a preface to the detailed description, it should be noted that, as used in this specification and the appended claims, the singular forms "a," "an," and "the" include plural referents, unless the context clearly dictates otherwise.

FIGS. 1-8 illustrate an exemplary fiber optical connector 100, for example, a hardened fiber optic connector, for terminating an optical fiber cable 190. The optical fiber cable 190 may include one or more fibers; however, the connector 100 is configured to terminate a single fiber 192. The fiber optical connector 100 includes a forward end 102 configured to be coupled with a fiber optic receptacle and a rearward end 104 into which the optical fiber cable 190 extends. The fiber optical connector 100 extends in a longitudinal axial direction from the forward end 102 to the rearward end 104. It should be appreciated that the mating between the fiber optical connector 100 and the receptacle may be secured using a threaded engagement, a quarter-turn lock, a quick release, a push-pull latch, or a bayonet configuration.

The connector 100 includes an inner housing 120, a connector sub-assembly 130, an outer housing 140, and a crimp sleeve 180. The outer housing 140 surrounds at least a portion of the inner housing 120 and the connector sub-assembly 130, and the inner housing 120 is a single piece of unitary construction (i.e., a monolithic structure).

Outer housing 140 may include a rigid material that is sufficient to withstand environmental conditions.

The fiber optical connector 100 uses a connector subassembly 130 of the SC type, but other types of connector assemblies such as LC, FC, ST, MT, and MT-RJ are contemplated by the present invention by using a suitable crimp housing. As illustrated, the connector sub-assembly 130 may be an industry standard SC type connector assembly having a connector body 132, a ferrule 134 in a ferrule basket 135, a spring 136, and a mandrel 138. As would be understood by persons skilled in the art, the ferrule 134 is held by the ferrule basket 135, which is axially slidable relative to the connector body 132 against a force of the spring 136 as limited by the connector body 132 and the mandrel 138.

Figure 3:
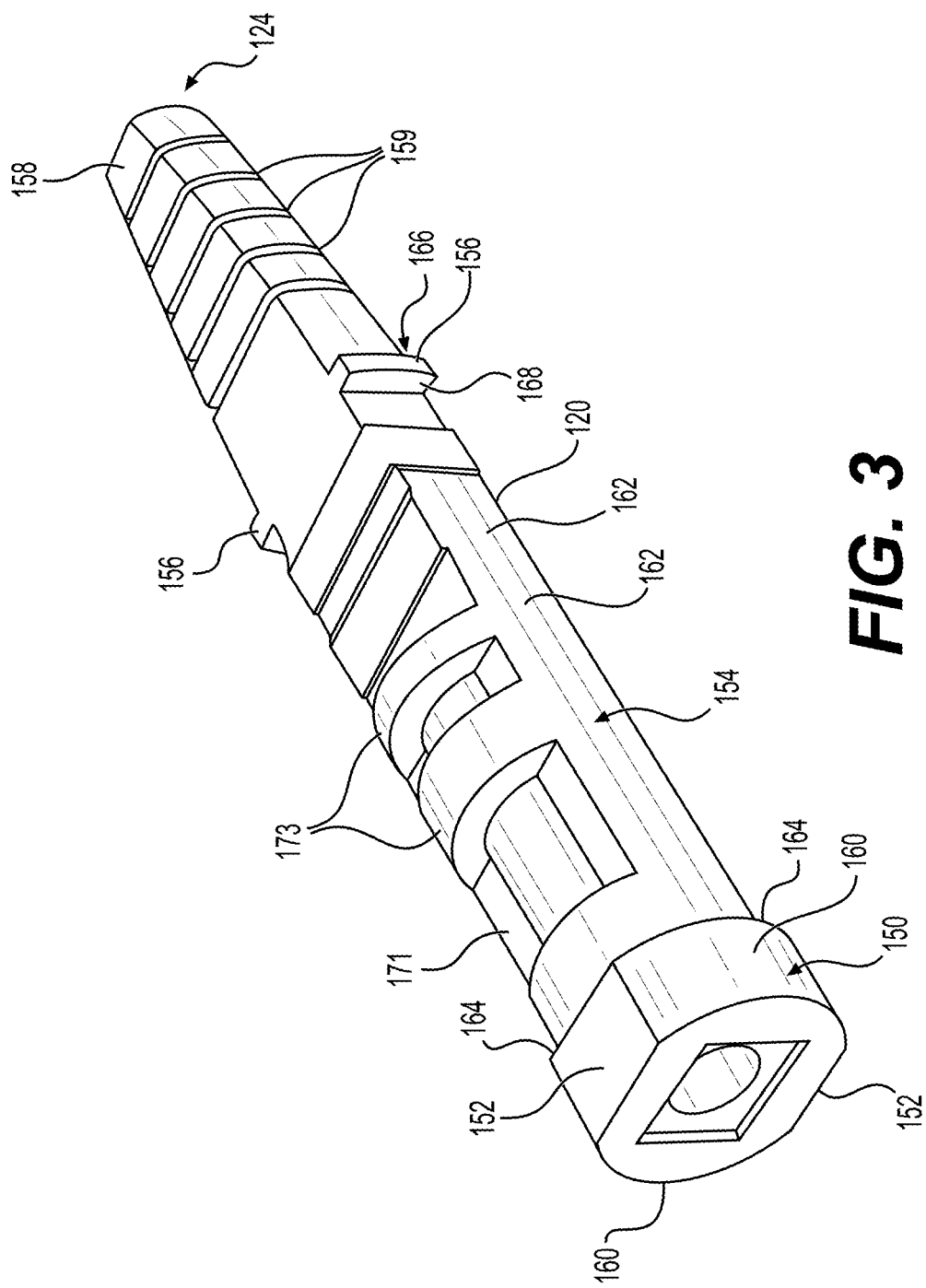
FIG. 3 is a perspective view of the inner housing of the exemplary connector of FIG. 1.

As shown in FIG. 3, the inner housing 120 includes a first end 122 toward the forward end 102 of the connector 100 and a second end 124 toward the rearward end 104 of the connector 100. The inner housing 120 includes a forward flange portion 150 having flattened outer peripheral portions 152 at opposed top and bottom regions of the forward flange portion 150. The flattened peripheral portions 152 of the forward flange portion 150 are configured to engage complementary portions of the outer housing 140 to prevent rotation of the inner housing 120 relative to the outer housing 140.

Figure 2:
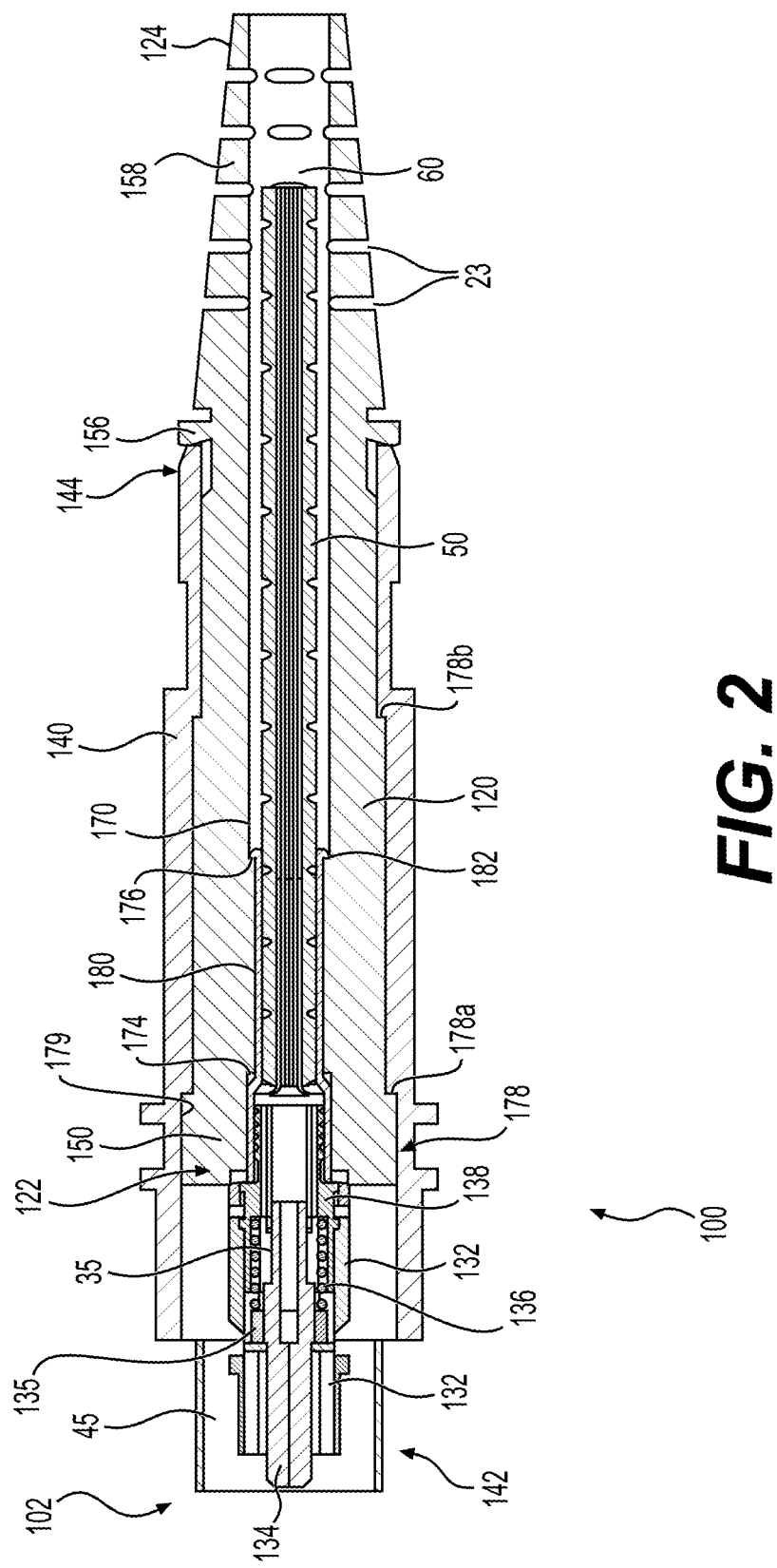
FIG. 2 is a top cross-sectional view of the exemplary connector of FIG. 1.
Figure 5:
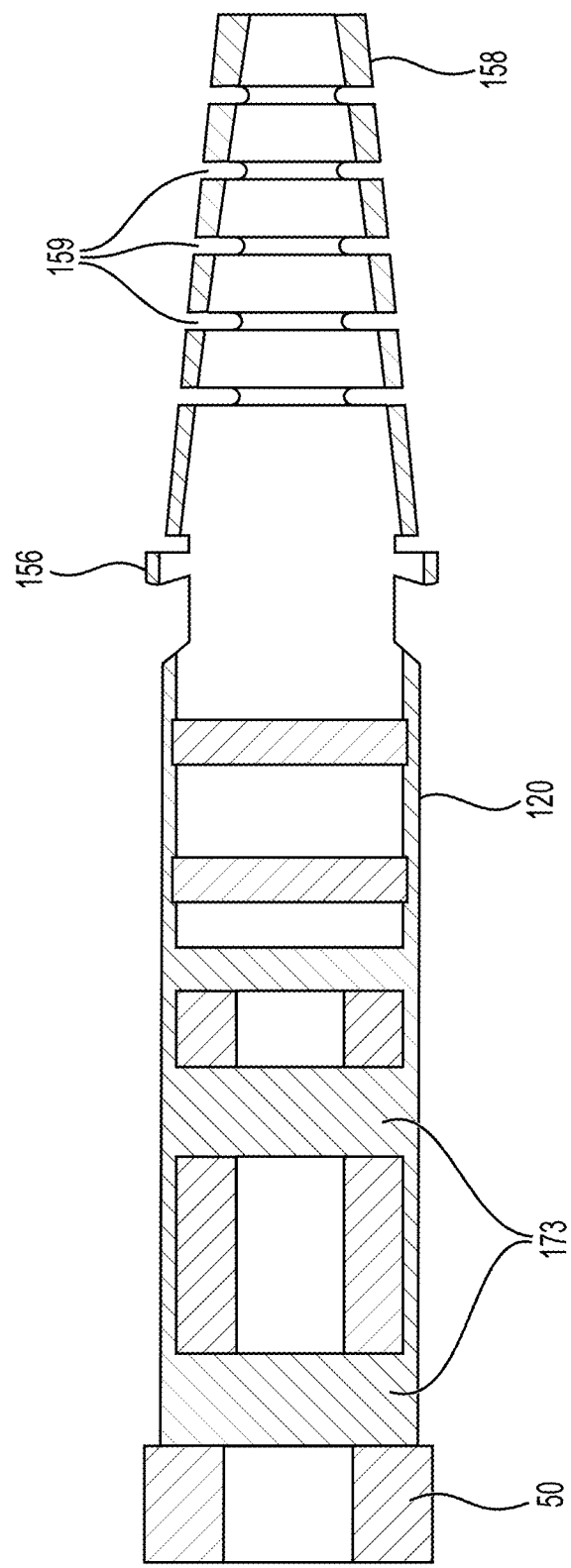
FIG. 5 is a top view of the inner housing of FIG. 3.
Figure 6:
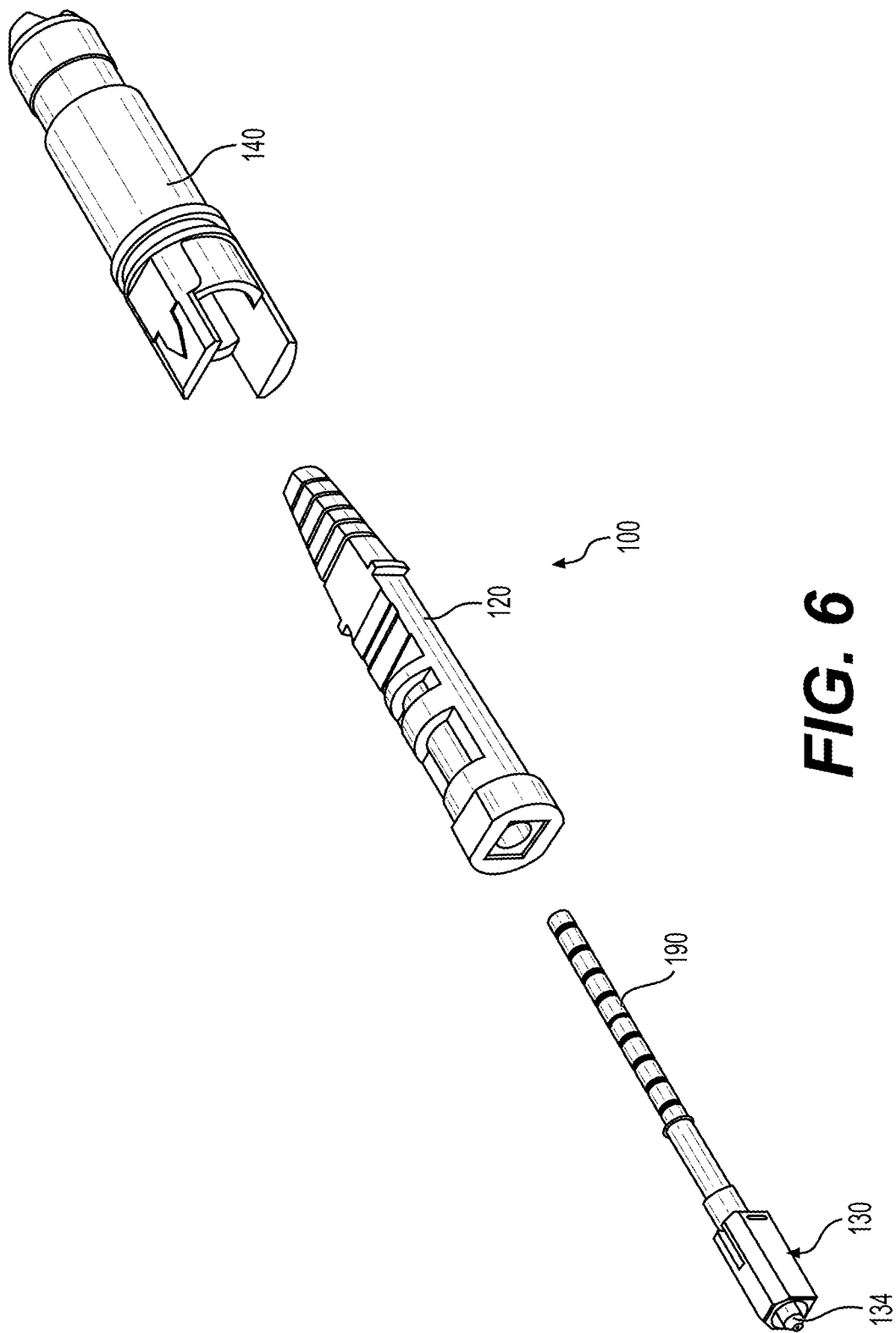
FIG. 6 is an exploded perspective view of the exemplary connector of FIG. 1.
Figure 7:
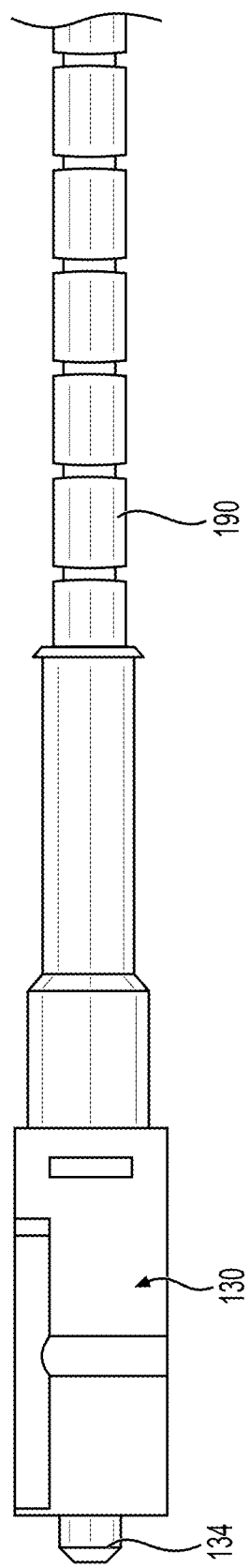
FIG. 7 is a side view of the connector sub-assembly and crimp sleeve of the exemplary connector of FIG. 1.

Referring to FIGS. 2 and 5, the inner housing 120 includes a body portion 154 extending from the forward flange portion 150 to a rearward flange portion 156 in the longitudinal direction and a boot portion 158 that extends rearward from the rearward flange portion 156 in the longitudinal direction. The boot portion 158 may be made from any conventional bendable material to provide strain relief for the cable 190. The boot portion 158 may include one or more notched portions 159 to enhance bendability of the boot portion 158. The boot portion 158 of the inner housing 120 may be a flexible member that provides an interface between the connector 100 and the optical fiber cable 190 and permits the optical fiber cable 190 to bend and/or and rotate relative to the connector 100.

The forward flange portion 156 includes a pair of opposed outer side walls 160 between the flattened peripheral portions 152 at the top and bottom regions. The body portion 154 has opposed outer side walls 162 aligned with the side walls 160 in the longitudinal direction. A side wall 162 to side wall 162 dimension in a transverse direction perpendicular to the longitudinal direction is less than a side wall 160 to side wall 160 dimension in the transverse direction. Thus, the inner housing 120 defines radially-extending surfaces 164 at the interface between the side walls 160 and the side walls 162 that face rearward in the longitudinal direction. Similarly, the rearward flange portion 156 includes a pair of opposed side walls 166 aligned with the side walls 160 and the side walls 162 in the longitudinal direction. A side wall 162 to side wall 162 dimension in a transverse direction perpendicular to the longitudinal direction is less than a side wall 166 to side wall 166 dimension in the transverse direction. Thus, the inner housing 120 defines radially-extending surfaces 168 at the interface between the side walls 166 and the side walls 162 that face forward in the longitudinal direction. As discussed in more detail below, the rearward facing surfaces 164 and the forward facing surfaces 168 are configured to secure the outer housing 140 to the inner housing 120.

As shown in FIG. 2, the inner housing 120 has an inner wall 170 that extends in the longitudinal direction and a projection 172 extending inward from the inner wall 170. The projection 172 may be an annular projection or one or more axial projections that are spaced apart from one another about the periphery of the inner wall 170. The projection 172 thus defines a radially-extending surface 174 that faces forward in the longitudinal direction and a radially-extending surface 176 that faces rearward in the longitudinal direction.

The outer housing 140 has a generally cylindrical shape with a first end 142 and a second end 144. The outer housing 140 generally protects the connector sub-assembly 130 and in some embodiments may also key the fiber optical connector 100 with the respective mating receptacle. Moreover, the outer housing 140 includes a through passageway between the first end 142 and the second end 144. As mentioned above, the passageway of the outer housing 140 is keyed so that inner housing 120 is inhibited from rotating when the fiber optical connector 100 is assembled. For example, an inner surface 178 of the outer housing includes flattened regions 179 that are configured to receive the complementary flattened peripheral portions 152 of the forward flange portion 150 to prevent rotation of the inner housing 120 relative to the outer housing 140. Additionally, the inner surface 178 of the outer housing 140 forming the passageway has one or more internal shoulders 178a, 178b configured to inhibit the inner housing 120 from being inserted into the outer housing 140 beyond a predetermined position.

The outer housing 140 includes at least one opening 148 extending from a medial portion of the outer housing 140 to the first end 142. In this case, the outer housing 140 includes a pair of opposed openings 148 at the first end 142, thereby defining alignment portions or fingers 149a, 149b. In addition to aligning the outer housing 140 with the receptacle during mating, alignment fingers 149a, 149b may protect the connector sub-assembly 130.

As shown in FIG. 1, the alignment fingers 149a, 149b may have different shapes and/or sizes so that the connector 100 can only mate with the receptacle in one orientation. It should be appreciated that the alignment fingers 149a, 149b may include alignment indicia so that a technician can quickly and easily mate the connector 100 with the receptacle. After the alignment fingers 149a, 149b are seated into the receptacle, the technician can engage the external threads of a coupling nut (not shown) with complementary internal threads of the receptacle to provide a secure optical connection.

Figure 4:
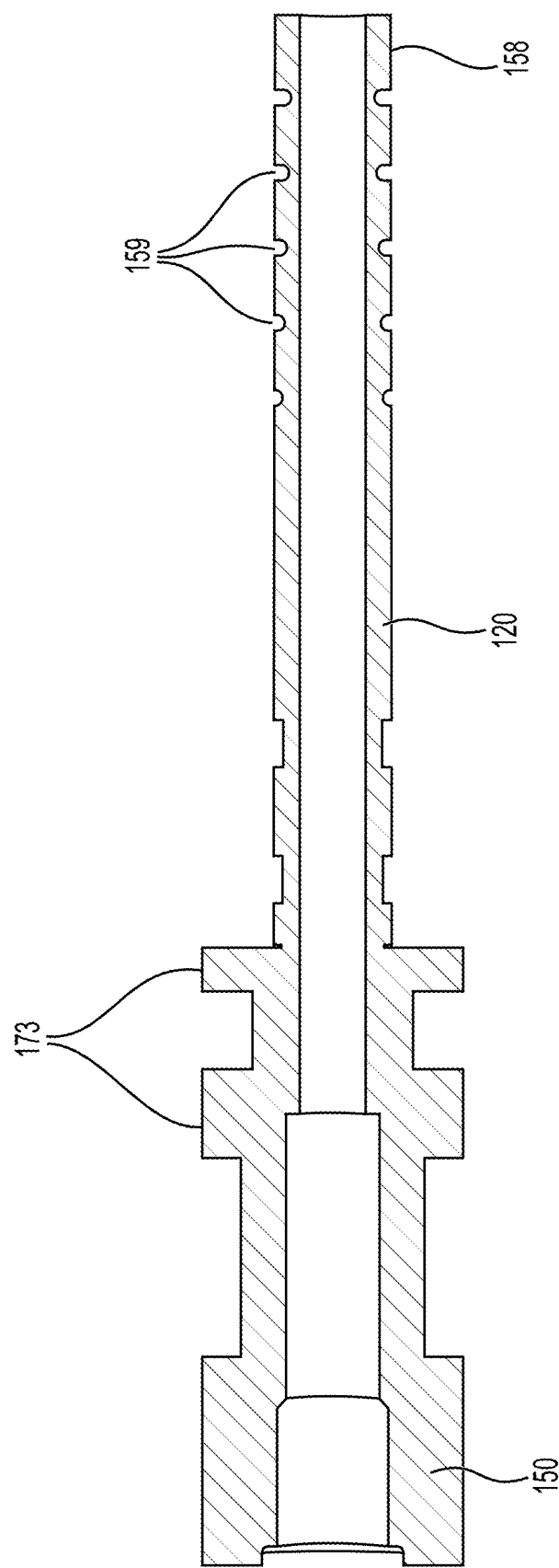
FIG. 4 is a side cross-sectional view of the inner housing of FIG. 3.

As best illustrated in FIGS. 3 and 4, the inner housing 120 has a generally flat outer wall 171 at top and bottom regions between the side walls 162. The inner housing 120 further includes one or more projections 173 extending outward from the outer wall 171. The one or more projections 173 are configured to substantially match the inner surface 178 of the outer housing 140 to seal the passageway. The portions of the flat outer wall 171 without the one or more projections facilitate sealing by the one or more projections 173 and reduce the overall material thickness to assist with the molding process, as would be understood by persons skilled in the art.

Figure 8:
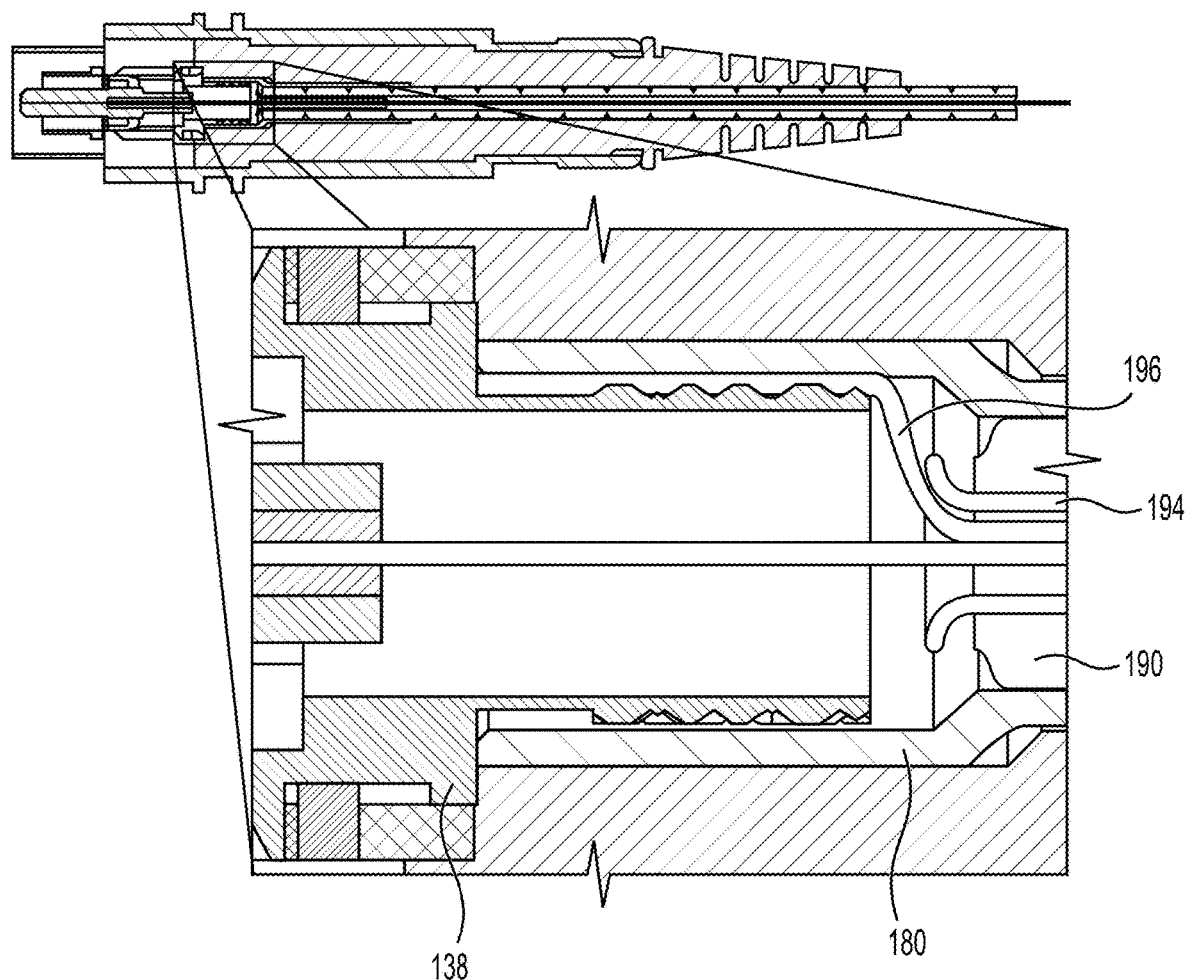
FIG. 8 is an enlarged cross-sectional view of the connector sub-assembly of the exemplary connector of FIG. 1.

Referring to FIGS. 2 and 8, the connector 100 includes a crimp ferrule 194 configured to be inserted into the fiber optic cable 190 between the one or more fibers 192 and an outer jacket 196 of the cable 190. The crimp ferrule 194 protects the one or more fibers 192 during termination of the cable 190 with the connector 100. The fiber optic cable 190 may includes one or more strengthening members 198, for example, Kevlar strands that run through the length of the fiber optic cable 190 along side the one or more fibers 192.

As shown in FIG. 8, the crimp sleeve 180 extends over a rear portion of the mandrel 138 to a shoulder portion 139 of the mandrel 138 and over a forward portion of the fiber optic cable 190. The crimp sleeve 180 includes an annular barb 182 or one or more circumferential barb portions at its rearward end that are configured to secure the inner housing 120 relative to the crimp sleeve 180. In particular, the projection 172 that extends inward from the inner wall 170 is retained between a tapered region 184 of the crimp sleeve 180, which results from crimping onto the mandrel 138, and the annular barb 182.

With one of the strengthening members 198 disposed on a radially outer surface of the mandrel 138, the crimp sleeve 180 is crimped onto the mandrel 138 and the fiber optic cable 190 to secure the connector sub-assembly 130 to the fiber optic cable 190.

When terminating the fiber optic cable 190 with the connector 100, which typically occurs at a manufacturing facility, the coupling nut and the outer housing 140 are slid over the fiber optic cable 190, followed by the inner housing 120 and then the mandrel 138. The crimp ferrule 194 is then inserted into the end of the fiber optic cable 190. A fiber 192 of the cable 190 is terminated with the ferrule 134, and the connector sub-assembly 130 is placed adjacent the fiber optic cable 190. A strengthening member 198 may be placed onto an outer surface of the rear portion of the mandrel 138. The crimp sleeve 180 is then moved forward over the rearward portion of the mandrel 138 until reaching the shoulder 139, while the rear portion of the mandrel 138 surrounds the fiber optic cable 190. The crimp sleeve 190 is crimped onto the mandrel 138 and the fiber optic cable 190 to secure the cable 190 to the connector sub-assembly 130.

Next, the inner housing 120 is slid forward until the projection 172 that extends inward from the inner wall 170 is retained between the tapered region 184 of the crimp sleeve 180 and the annular barb 182 at the rearward end of the crimp sleeve 180. The elastic nature of the inner housing 120, which is made, for example, from rubber or any known elastomer, enables the inner housing 120 to defect over the annular barb 182 and onto the outer surface of the inner housing 120. The outer housing 140 is the slide forward over the inner housing 120 until a shoulder 141 of the outer housing 140 reaches the rearward facing surfaces 164 of the inner housing 120 and the rear end 144 of the outer housing 140 is positioned forward of the forward facing surfaces 168 of the rearward flange portion 156. The coupling nut can then be slid forward to a position limited by projections from the outer surface of the outer housing so as to be configured to couple the connector 100 to the receptacle.

Figure 9:
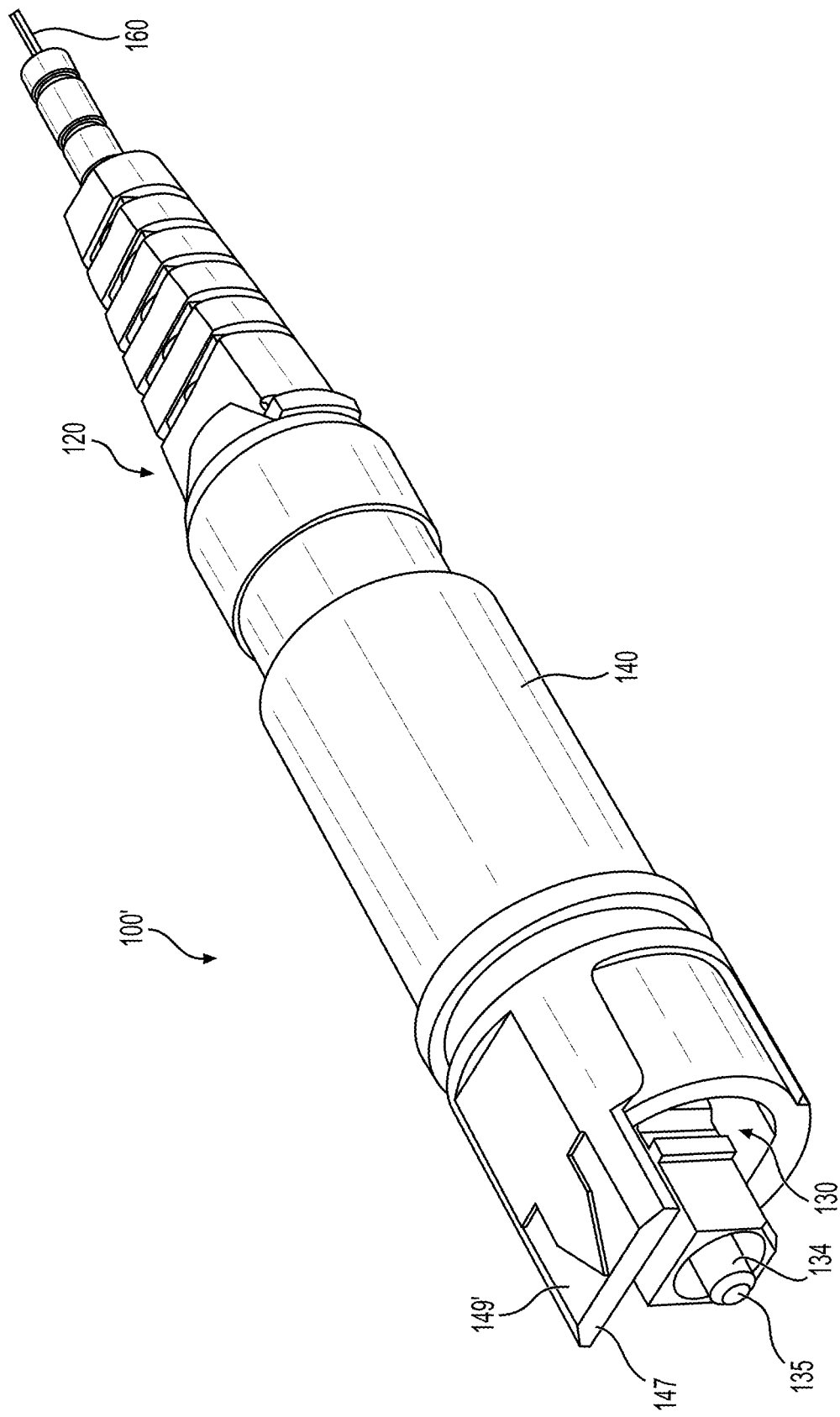
FIG. 9 is a perspective view of another exemplary hardened fiber optic connector in accordance with various aspects of the disclosure.
Figure 10:
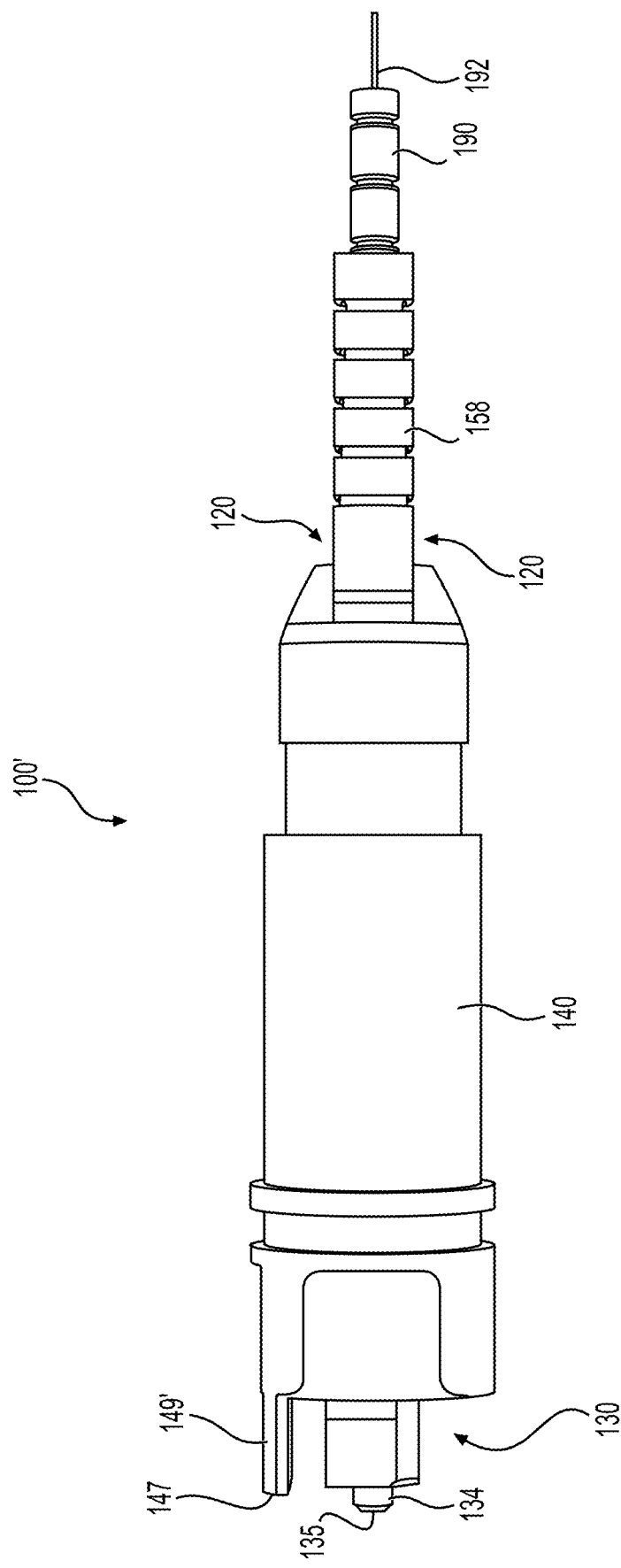
FIG. 10 is a side view of the exemplary connector of FIG. 9.

FIGS. 9 and 10 illustrate another exemplary fiber optical connector 100', for example, a hardened fiber optic connector, for attachment of an optical fiber cable with a ferrule. Connector 100' includes the inner housing 120, the connector sub-assembly 130, and the crimp sleeve 180 as described above in connection with the embodiment of FIGS. 1-8. The outer housing 140' is similar to the outer housing 140 described above, but the first end 142' of the outer housing 140' includes only a single projection 149' disposed radially outward of ferrule housing sub-assembly 130. Also, as shown in FIG. 10, the single projection 149' has a length configured such that a forward end 147 of the projection 149' does not extend beyond a forward end 135 of the ferrule 134 of the ferrule housing sub-assembly 130.

FIGS. 11-15 illustrate another exemplary fiber optical connector 200, for example, a hardened fiber optic connector, for attachment of an optical fiber cable with a ferrule. The connector 200 includes a connector sub-assembly 230, an outer housing 240, and a crimp sleeve 280, which are similar to the same parts described above in connection with the embodiment of FIGS. 1-8. The connector 200 further includes a first inner housing 220a and a second inner housing 220b. The outer housing 240 surrounds the first inner housing 220a and at least a portion of the second inner housing 220a and the connector sub-assembly 230. The first inner housing 220a is constructed of a relatively rigid plastic that is more rigid that the second inner housing 220b, which is constructed of rubber or an elastomer. Outer housing 240 may include a rigid material that is sufficient to withstand environmental conditions.

The fiber optical connector 200 uses a connector subassembly 230 of the SC type, but other types of connector assemblies such as LC, FC, ST, MT, and MT-RJ are contemplated by the present invention by using a suitable crimp housing. As illustrated, the connector sub-assembly 230 may be an industry standard SC type connector assembly having a connector body 232, a ferrule 234 in a ferrule basket 235, a spring 236, and a mandrel 238. As would be understood by persons skilled in the art, the ferrule 234 is held by the ferrule basket 235, which is axially slidable relative to the connector body 232 against a force of the spring 236 as limited by the connector body 232 and the mandrel 238.

Figure 13:
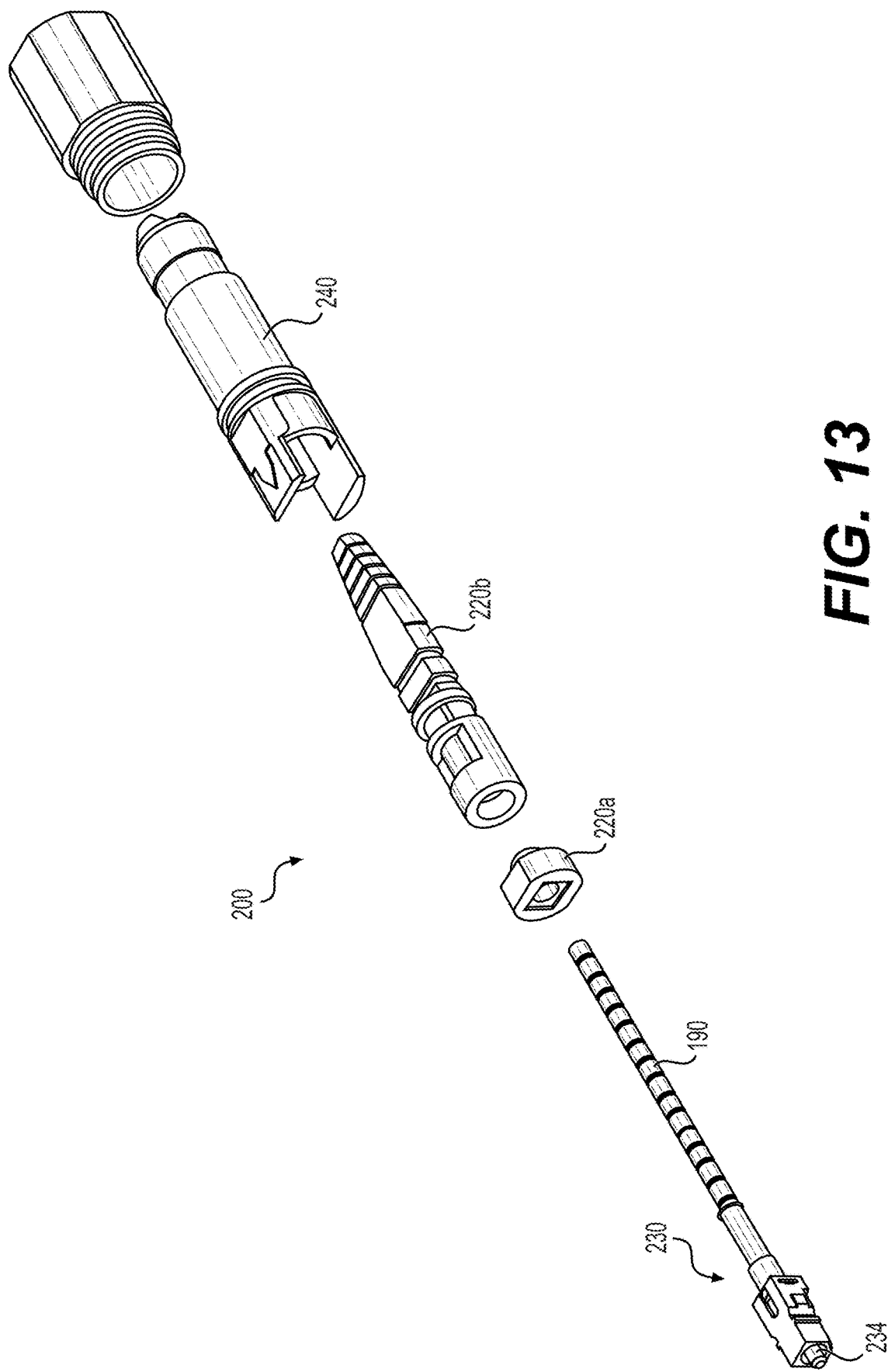
FIG. 13 is an exploded perspective view of the inner housing of the exemplary connector of FIG. 11.
Figure 14:
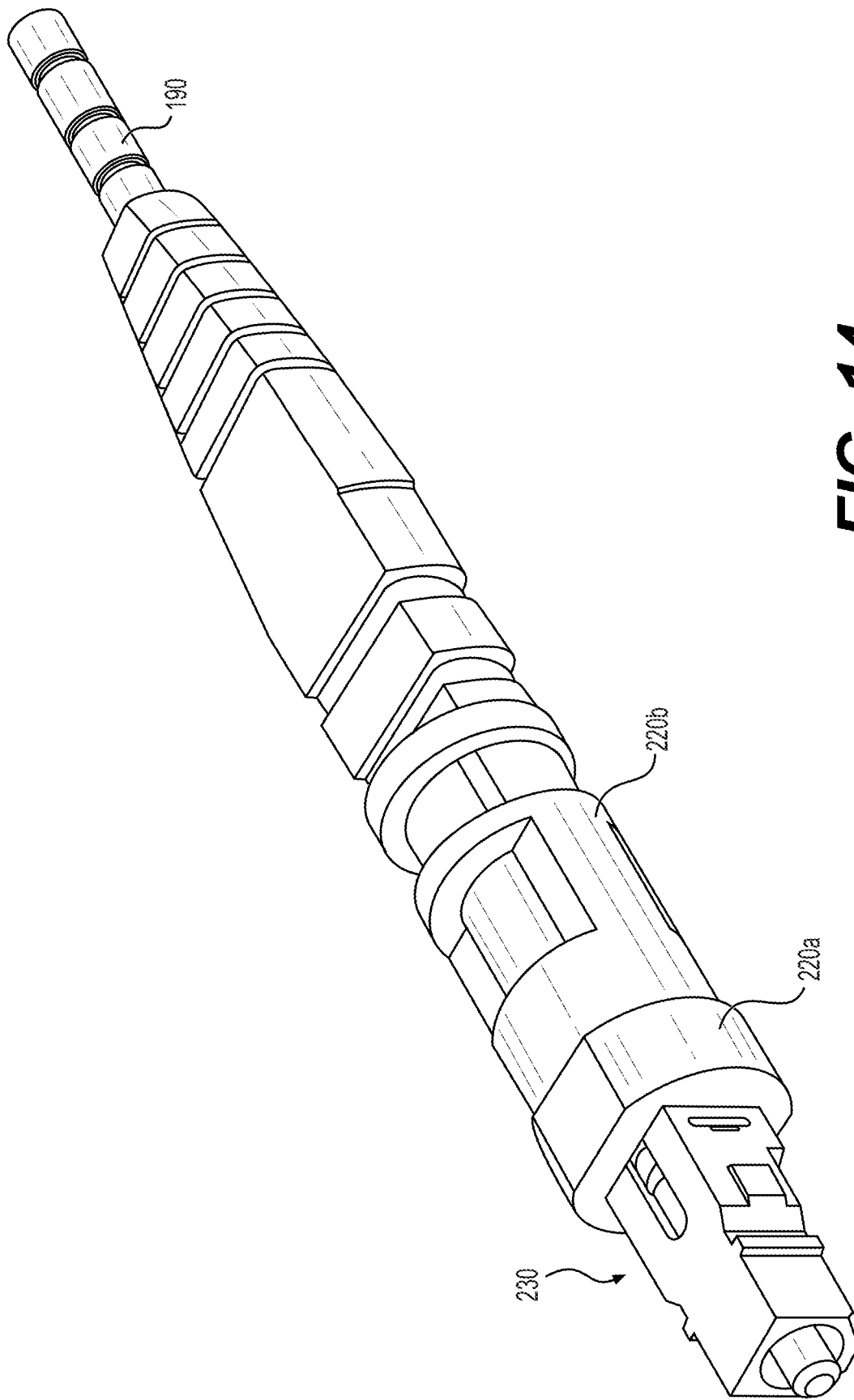
FIG. 14 is a perspective view of the inner housing and the connector sub-assembly of the exemplary connector of FIG. 11.

As shown in FIG. 13, the first inner housing 220a is disposed toward the forward end 202 of the connector 200 relative to the second inner housing 220b. The first inner housing 220a has a first forward end 222 configured to engage a shoulder 278 defined by an inner surface 278 of the outer housing 240 to limit the distance that the first inner housing 220a can move in the forward direction relative to the outer housing 240. A second rearward end 224 of the first inner housing 220a includes a radially outward extending barb 225 toward the rearward end 204 of the connector 200. The first forward end 222 of the first inner housing 220a includes flattened outer peripheral portions 252 at opposed top and bottom regions of the first inner housing 220a. The flattened peripheral portions 252 are configured to engage complementary portions of the outer housing 240 to prevent rotation of the first inner housing 220a relative to the outer housing 240.

Figure 12:
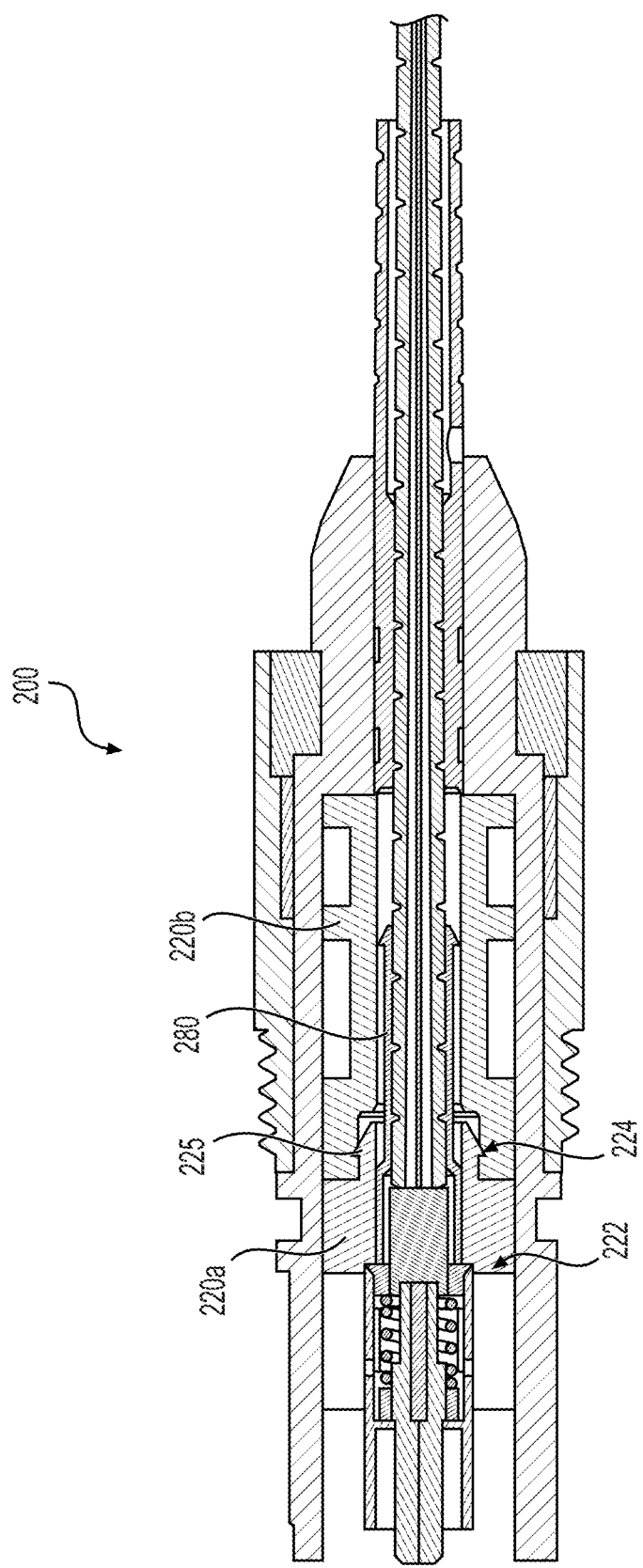
FIG. 12 is a side cross-sectional view of the exemplary connector of FIG. 11.

Referring to FIGS. 12 and 13, the second inner housing 220b includes a body portion 254 extending from the first inner housing 220a to a rearward boot portion 258 that extends rearward in the longitudinal direction. The boot portion 258 may be made from any conventional bendable material to provide strain relief for the cable 190. The boot portion 258 may include one or more notched portions 259 to enhance bendability of the boot portion 258. The boot portion 258 of the second inner housing 220b may be a flexible member that provides an interface between the connector 200 and the optical fiber cable 190 and permits the optical fiber cable 190 to bend and/or and rotate relative to the connector 200.

As shown in FIG. 12, the second inner housing 220b has an inner wall 270 that extends in the longitudinal direction and a projection 272 extending inward from the inner wall 270. The projection 272 may be an annular projection or one or more axial projections that are spaced apart from one another about the periphery of the inner wall 270. The projection 272 thus defines a radially-extending surface 274 that faces forward in the longitudinal direction and a radially-extending surface 276 that faces rearward in the longitudinal direction.

The outer housing 240 has a generally cylindrical shape with a first end 242 and a second end 244. The outer housing 240 generally protects the connector sub-assembly 230 and in some embodiments may also key the fiber optical connector 200 with the respective mating receptacle. Moreover, the outer housing 240 includes a through passageway between the first end 242 and the second end 244. As mentioned above, the passageway of the outer housing 240 is keyed so that the first inner housing 220a is inhibited from rotating when the fiber optical connector 200 is assembled. For example, an inner surface 278 of the outer housing includes flattened regions 279 that are configured to receive the complementary flattened peripheral portions 252 of the forward flange portion 250 to prevent rotation of the first inner housing 220a relative to the outer housing 240. Additionally, the inner surface 278 of the outer housing 240 forming the passageway has the shoulder 278 configured to inhibit the first inner housing 220a from being inserted into the outer housing 240 beyond a predetermined position.

The outer housing 240 includes at least one opening 248 extending from a medial portion of the outer housing 240 to the first end 242. In this case, the outer housing 240 includes a pair of opposed openings 248 at the first end 242, thereby defining alignment portions or fingers 249a, 249b. In addition to aligning the outer housing 240 with the receptacle during mating, alignment fingers 249a, 249b may protect the connector sub-assembly 230.

Figure 11:
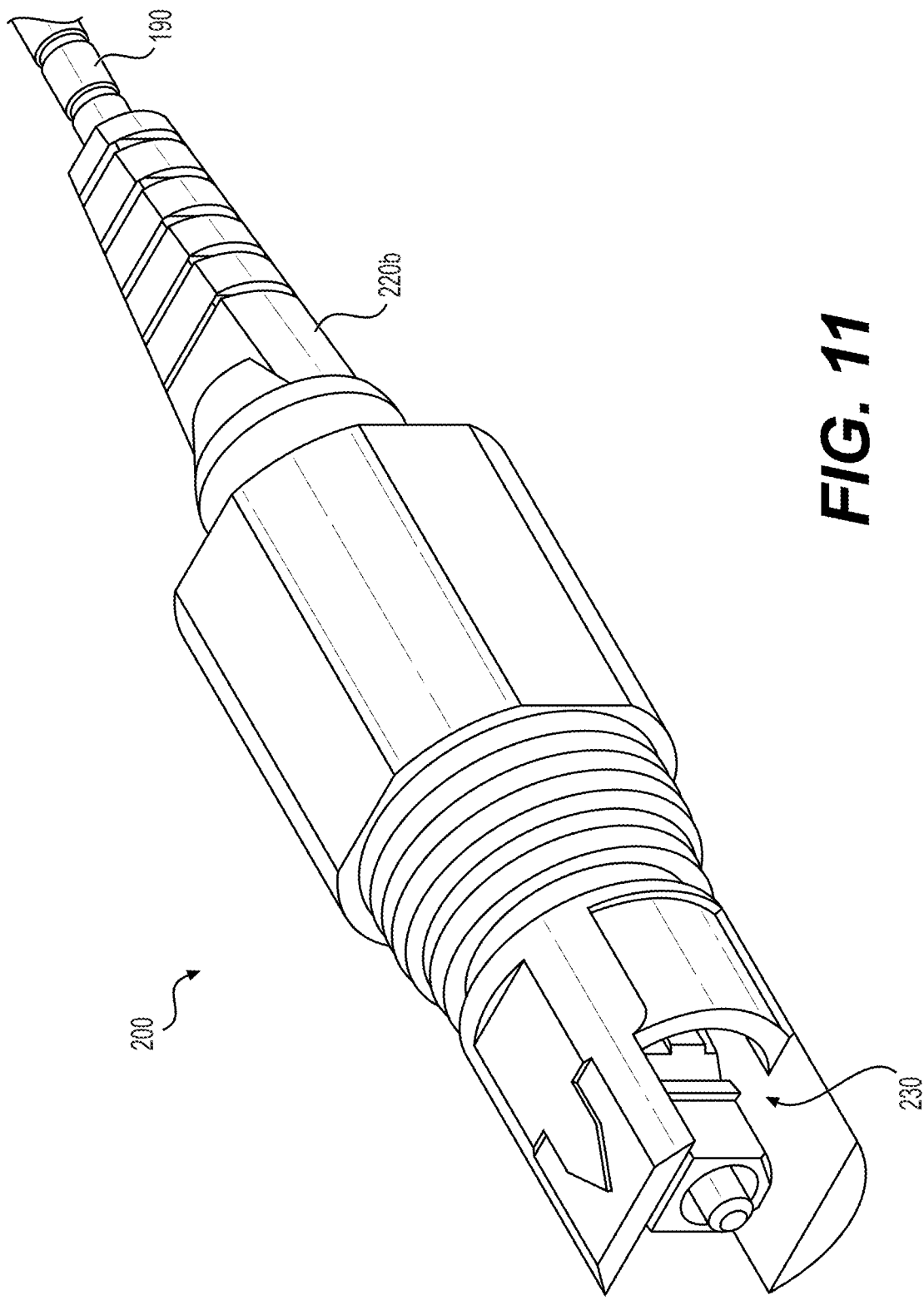
FIG. 11 is a perspective view of another exemplary hardened fiber optic connector in accordance with various aspects of the disclosure.

As shown in FIG. 11, the alignment fingers 249a, 249b may have different shapes and/or sizes so that the connector 200 can only mate with the receptacle in one orientation. It should be appreciated that the alignment fingers 249a, 249b may include alignment indicia so that a technician can quickly and easily mate the connector 200 with the receptacle. After the alignment fingers 249a, 249b are seated into the receptacle, the technician can engage the external threads of a coupling nut (not shown) with complementary internal threads of the receptacle to provide a secure optical connection.

As best illustrated in FIG. 13, the second inner housing 220b has a generally flat outer wall 271 at top and bottom regions between the side walls 262. The second inner housing 220b further includes one or more projections 273 extending outward from the outer wall 271. The one or more projections 273 are configured to substantially match the inner surface 278 of the outer housing 240 to seal the passageway. The portions of the flat outer wall 271 without the one or more projections facilitate sealing by the one or more projections 273 and reduce the overall material thickness to assist with the molding process, as would be understood by persons skilled in the art.

Referring to FIG. 2, the connector 200 includes a crimp ferrule 294 configured to be inserted into the fiber optic cable 190 between the one or more fibers 192 and an outer jacket 196 of the cable 190. The crimp ferrule 294 protects the one or more fibers 192 during termination of the cable 190 with the connector 200. The fiber optic cable 190 may includes one or more strengthening members 198, for example, Kevlar strands that run through the length of the fiber optic cable 190 along side the one or more fibers 192.

Figure 15:
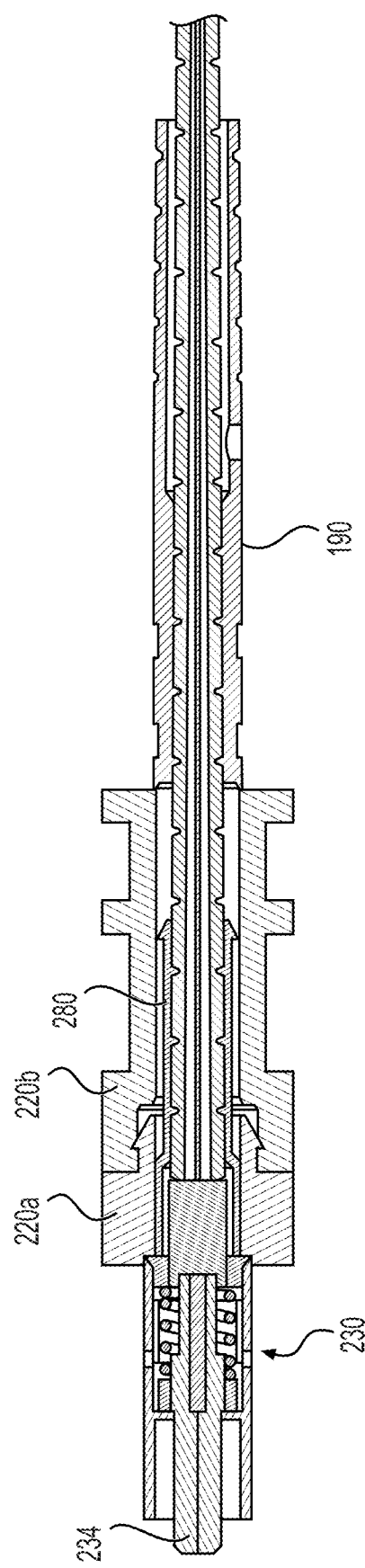
FIG. 15 is a side cross-sectional view of the inner housing and the connector sub-assembly of FIG. 14.

As shown in FIGS. 12 and 15, the crimp sleeve 280 extends over a rear portion of the mandrel 238 to a shoulder portion 239 of the mandrel 238 and over a forward portion of the fiber optic cable 190. The crimp sleeve 280 includes an annular barb 282 or one or more circumferential barb portions at its rearward end that are configured to secure the second inner housing 220b relative to the crimp sleeve 280. With one of the strengthening members 198 disposed on a radially outer surface of the mandrel 238, the crimp sleeve 280 is crimped onto the mandrel 238 and the fiber optic cable 190 to secure the connector sub-assembly 230 to the fiber optic cable 190.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A hardened fiber optic connector configured to terminate a fiber optic cable, comprising:
   a connector sub-assembly that includes a ferrule basket configured to receive a ferrule that terminates a fiber of a fiber optic cable;
   an inner housing configured to receive the fiber optic cable there through and to be coupled with the connector sub-assembly;
   an outer housing configured to surround and be coupled with the inner housing;
   a crimp sleeve configured to surround and be crimped onto a rearward portion of the connector sub-assembly and an end portion of the fiber optic cable to secure the connector sub-assembly to the fiber optic cable;
   wherein the crimp sleeve includes opposed outward extending surfaces configured to restrict axial movement of an inward projection of the inner housing relative to the crimp sleeve;
   wherein the inner housing includes opposed radially extending surfaces configured to restrict axial movement of a portion of the outer housing relative to the inner housing;
   wherein the inner housing includes a peripheral portion configured to engage the outer housing in order to prevent relative rotation between the inner housing and the outer housing;
   wherein the outer housing includes a threaded portion that is configured to threadedly receive a coupler that is configured to threadedly couple the hardened fiber optic connector with a receptacle, and wherein the outer housing includes an alignment portion that is configured to extend beyond a forward end of the ferrule;
   wherein a first end of the inner housing includes a flange portion having a rearward facing surface that is configured to engage a forward facing surface of the outer housing; and
   wherein the inner housing includes a radially outward extending engagement portion between the flange portion and a boot portion of the inner housing, and wherein the engagement portion is configured to engage a rearward facing end surface of the outer housing so as to prevent axial movement of the outer housing relative to the inner housing.

2. The hardened fiber optic connector of claim 1, wherein the crimp sleeve is configured to be crimped onto a mandrel at a rear end of the connector sub-assembly.

3. The hardened fiber optic connector of claim 2, wherein the connector sub-assembly comprises:
   a connector body;
   wherein the ferrule basket is configured to be axially slidable relative to the connector body against a force of a spring; and
   wherein a sliding range of the ferrule and ferrule basket is limited by the connector body and the mandrel.

4. The hardened fiber optic connector of claim 1, wherein the inner housing includes a first end toward a forward end of the connector and a second end toward the rearward end of the connector,
   wherein the peripheral portion of the inner housing includes a forward flange portion having flattened outer peripheral portions at opposed top and bottom regions of the forward flange portion, and
   wherein the flattened peripheral portions of the forward flange portion are configured to engage complementary flattened portions of the outer housing to prevent rotation of the inner housing relative to the outer housing.

5. The hardened fiber optic connector of claim 1, wherein the inner housing comprises:
   a body portion extending from the forward flange portion to a rearward flange portion in the longitudinal direction; and
   a boot portion that extends rearward from the rearward flange portion in the longitudinal direction.

6. The hardened fiber optic connector of claim 5, wherein the boot portion comprises rubber or an elastomer configured to provide strain relief for the fiber optic cable.

7. The hardened fiber optic connector of claim 1, wherein the inner housing comprises a single piece of unitary construction.

8. The hardened fiber optic connector of claim 1, wherein the inner housing comprises a first housing portion and a second housing portion.

9. The hardened fiber optic connector of claim 8, wherein the first housing portion and the second housing portion are separate structures that are configured to be coupled to one another.

10. The hardened fiber optic connector of claim 9, wherein the first housing portion comprises a plastic and the second housing portion comprises rubber or an elastomer, such that the first housing portion is configured to be more rigid than the second housing portion.

11. A hardened fiber optic connector configured to terminate a fiber optic cable, comprising:
   a connector sub-assembly that includes a ferrule basket configured to receive a ferrule that terminates a fiber of a fiber optic cable;
   an inner housing configured to receive the fiber optic cable there through and to be coupled with the connector sub-assembly;
   an outer housing configured to surround and be coupled with the inner housing;
   a crimp sleeve configured to surround and be crimped onto a rearward portion of the connector sub-assembly and an end portion of the fiber optic cable to secure the connector sub-assembly to the fiber optic cable;
   wherein the crimp sleeve includes two outward extending surfaces that face one another and is configured to receive an inward projection of the inner housing between the two outward extending surfaces such that the crimp sleeve is configured to restrict axial movement of the inner housing relative to crimp sleeve;
   wherein the inner housing includes radially extending surfaces that face one another and is configured to receive to receive a portion of the outer housing between the radially extending surfaces so as to restrict axial movement the outer housing relative to the inner housing;
   wherein the inner housing includes a peripheral portion configured to engage the outer housing in order to prevent relative rotation between the inner housing and the outer housing;
   wherein the outer housing includes a threaded portion that is configured to threadedly receive a coupler that is configured to threadedly couple the hardened fiber optic connector with a receptacle, and wherein the outer housing includes an alignment portion that is configured to extend beyond a forward end of the ferrule;
   wherein a first end of the inner housing includes a flange portion having a rearward facing surface that is configured to engage a forward facing surface of the outer housing; and
   wherein the inner housing includes a radially outward extending engagement portion between the flange portion and a boot portion of the inner housing, and wherein the engagement portion is configured to engage a rearward facing end surface of the outer housing so as to prevent axial movement of the outer housing relative to the inner housing.

12. The hardened fiber optic connector of claim 11, wherein the crimp sleeve is configured to be crimped onto a mandrel at a rear end of the connector sub-assembly.

13. The hardened fiber optic connector of claim 12, wherein the connector sub-assembly comprises:
   a connector body;
   wherein the ferrule basket is configured to be axially slidable relative to the connector body against a force of a spring; and
   wherein a sliding range of the ferrule and ferrule basket is limited by the connector body and the mandrel.

14. The hardened fiber optic connector of claim 11, wherein the inner housing includes a first end toward a forward end of the connector and a second end toward the rearward end of the connector,
   wherein the peripheral portion of the inner housing includes a forward flange portion having flattened outer peripheral portions at opposed top and bottom regions of the forward flange portion, and
   wherein the flattened peripheral portions of the forward flange portion are configured to engage complementary flattened portions of the outer housing to prevent rotation of the inner housing relative to the outer housing.

15. The hardened fiber optic connector of claim 11, wherein the inner housing comprises:
   a body portion extending from the forward flange portion to a rearward flange portion in the longitudinal direction; and
   a boot portion that extends rearward from the rearward flange portion in the longitudinal direction.

16. The hardened fiber optic connector of claim 15, wherein the boot portion comprises rubber or an elastomer configured to provide strain relief for the fiber optic cable.

17. The hardened fiber optic connector of claim 15, wherein the body portion and the boot portion comprise a single piece of unitary construction.

18. The hardened fiber optic connector of claim 11, wherein the inner housing comprises a first housing portion and a second housing portion.

19. The hardened fiber optic connector of claim 18, wherein the first housing portion and the second housing portion are separate structures that are configured to be coupled to one another.

20. The hardened fiber optic connector of claim 19, wherein the first housing portion comprises a plastic and the second housing portion comprises rubber or an elastomer, such that the first housing portion is configured to be more rigid than the second housing portion.

21. The hardened fiber optic connector of claim 11, further comprising a coupling nut configured to be slidingly received over the outer housing;
wherein the connector is configured to be inserted into a receptacle; and
wherein the coupling nut includes external threads configured to engage internal threads of the receptacle.

22. A hardened fiber optic connector configured to terminate a fiber optic cable, comprising:
a connector sub-assembly configured to include a ferrule basket that is configured to receive a ferrule that terminates a fiber of a fiber optic cable;
an inner housing configured to receive the fiber optic cable there through and to be coupled with the connector sub-assembly;
an outer housing configured to surround and be coupled with the inner housing;
a crimp portion having a first end configured to surround and be crimped onto a rearward portion of the connector sub-assembly and an end portion of the fiber optic cable to secure the connector sub-assembly to the fiber optic cable;
wherein the crimp sleeve includes a radially outward projection at a second end opposite to the first end, and wherein the radially outward projection is configured to engage a rearward facing surface at a rearward end of the inner housing so as to restrict axial movement of the inner housing relative to the crimp sleeve;
wherein the inner housing includes a peripheral portion that is configured to engage the outer housing so as to prevent relative rotation between the inner housing and the outer housing;
wherein the outer housing includes a threaded portion that is configured to threadedly receive a coupler that is configured to threadedly couple the hardened fiber optic connector with a receptacle, and wherein the outer housing includes an alignment portion that is configured to extend beyond a forward end of the ferrule;
wherein a first end of the inner housing includes a flange portion having a rearward facing surface that is configured to engage a forward facing surface of the outer housing; and
wherein the inner housing includes a radially outward extending engagement portion between the flange portion and a boot portion of the inner housing, and wherein the engagement portion is configured to engage a rearward facing end surface of the outer housing so as to prevent axial movement of the outer housing relative to the inner housing.

23. The hardened fiber optic connector of claim 22, wherein the crimp sleeve is configured to be crimped onto a mandrel at a rear end of the connector sub-assembly.

24. The hardened fiber optic connector of claim 23, wherein the connector sub-assembly comprises:
a connector body;
wherein the ferrule basket is configured to be axially slidable relative to the connector body against a force of a spring; and
wherein a sliding range of the ferrule and ferrule basket is limited by the connector body and the mandrel.

25. The hardened fiber optic connector of claim 22, wherein the peripheral portion of the inner housing includes flattened outer peripheral portions at opposed top and bottom regions of the flange portion; and
wherein the flattened peripheral portions of the forward flange portion are configured to engage complementary flattened portions of the outer housing to prevent rotation of the inner housing relative to the outer housing.

26. The hardened fiber optic connector of claim 22, wherein the inner housing comprises:
a body portion extending from the flange portion to the engagement portion in the longitudinal direction; and
the boot portion extends rearward from the engagement portion in the longitudinal direction.

27. The hardened fiber optic connector of claim 26, wherein the boot portion comprises rubber or an elastomer configured to provide strain relief for the fiber optic cable.

28. The hardened fiber optic connector of claim 26, wherein the body portion and the boot portion comprise a single, monolithic piece of unitary construction.

29. The hardened fiber optic connector of claim 22, wherein the inner housing comprises a first housing portion and a second housing portion.

30. The hardened fiber optic connector of claim 29, wherein the first housing portion and the second housing portion are separate structures that are configured to be coupled to one another.

31. The hardened fiber optic connector of claim 30, wherein the first housing portion comprises a plastic and the second housing portion comprises rubber or an elastomer, such that the first housing portion is configured to be more rigid than the second housing portion.

* * * * *